United States Patent
Zhao et al.

(10) Patent No.: US 11,496,974 B2
(45) Date of Patent: Nov. 8, 2022

(54) SYNCHRONIZATION METHOD AND TERMINAL APPARATUS

(71) Applicant: DATANG MOBILE COMMUNICATIONS EQUIPMENT CO., LTD., Beijing (CN)

(72) Inventors: Li Zhao, Beijing (CN); Ying Peng, Beijing (CN); Rui Zhao, Beijing (CN); Chenxin Li, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 109 days.

(21) Appl. No.: 17/256,912

(22) PCT Filed: Jun. 20, 2019

(86) PCT No.: PCT/CN2019/092097
§ 371 (c)(1),
(2) Date: Dec. 29, 2020

(87) PCT Pub. No.: WO2020/001364
PCT Pub. Date: Jan. 2, 2020

(65) Prior Publication Data
US 2021/0368458 A1    Nov. 25, 2021

(30) Foreign Application Priority Data
Jun. 29, 2018  (CN) .......................... 201810713975.7

(51) Int. Cl.
*H04W 56/00* (2009.01)
*H04L 27/26* (2006.01)
*G01S 19/25* (2010.01)

(52) U.S. Cl.
CPC ......... *H04W 56/001* (2013.01); *G01S 19/256* (2013.01); *H04L 27/26025* (2021.01); *H04W 56/006* (2013.01)

(58) Field of Classification Search
None
See application file for complete search history.

(56) References Cited

U.S. PATENT DOCUMENTS

| | | | |
|---|---|---|---|
| 11,051,264 B2 * | 6/2021 | Feng ................. | H04W 56/0015 |
| 2017/0150463 A1 * | 5/2017 | Shen ................. | H04W 56/0015 |

(Continued)

FOREIGN PATENT DOCUMENTS

| | | |
|---|---|---|
| CN | 1370355 A | 9/2002 |
| CN | 101079630 A | 11/2007 |

(Continued)

OTHER PUBLICATIONS

CATT, "Synchronization enhancements in PC5-based V2V," 3GPP TSG RAN WG1 Meeting #87, R1-1611339, Agenda Item 6.2.1.7, Reno, USA, Nov. 14-18, 2016.

(Continued)

*Primary Examiner* — Gregory B Sefcheck
*Assistant Examiner* — Amarnauth G Persaud
(74) *Attorney, Agent, or Firm* — Meunier Carlin & Curfman LLC (57) ABSTRACT

Disclosed are a synchronization method and a terminal apparatus resolving the issue of how to support synchronization of resources having different SCSs. The synchronization method includes: a terminal apparatus determining a type of synchronization sources, the synchronization sources including one or more combinations of: a base station in a Long Term Evolution (LTE) network, a base station in the Fifth Generation Mobile Communication Technology (5G) network, a Global Navigation Satellite System (GNSS) and a communication node; the terminal apparatus determining, from one or more synchronization sources matching the (Continued)

type, a synchronization source of the terminal apparatus; and the terminal apparatus synchronizing with the determined synchronization source.

18 Claims, 2 Drawing Sheets

(56) References Cited

U.S. PATENT DOCUMENTS

| | | | |
|---|---|---|---|
| 2017/0257774 A1 | 9/2017 | Ghosh et al. | |
| 2018/0077710 A1 | 3/2018 | Ly et al. | |
| 2018/0213500 A1* | 7/2018 | Li | H04W 56/0015 |
| 2019/0059071 A1* | 2/2019 | Khoryaev | H04W 4/027 |
| 2020/0267671 A1* | 8/2020 | Chae | H04W 92/18 |
| 2020/0314782 A1* | 10/2020 | Ruffini | H04W 56/0015 |

FOREIGN PATENT DOCUMENTS

| | | |
|---|---|---|
| CN | 102469569 A | 5/2012 |
| CN | 106797611 A | 5/2017 |
| CN | 107046461 A | 8/2017 |
| CN | 107295626 A | 10/2017 |
| CN | 107959960 A | 4/2018 |
| CN | 108040365 A | 5/2018 |
| EP | 3340699 A1 | 6/2018 |
| WO | 2017052687 A1 | 3/2017 |

OTHER PUBLICATIONS

HiSilicon Huawei, "Synchronization procedure and synchronization source priority for V2V," 3GPP TSG RAN WG1 Meeting #84, R1-180306, Agenda Item 7.3.2.4, St. Julian's Malta, Feb. 15-19, 2016.

International Search Report for International Application No. PCT/CN2019/092097 dated Sep. 9, 2019.

* cited by examiner

SYNCHRONIZATION METHOD AND TERMINAL APPARATUS

This application is a national phase entry under 35 U.S.C. § 371 of International Application No. PCT/CN2019/092097, filed on Jun. 20, 2019, which claims the priority of Chinese Patent Application No. 201810713975.7, filed with the China National Intellectual Property Administration on Jun. 29, 2018 and entitled "Synchronization Method and Terminal Apparatus", the entire content of which is incorporated herein by reference.

FIELD

This application relates to the technical field of communication, in particular to a synchronization method and a terminal apparatus.

BACKGROUND

A radio air interface technology (New Radio, called NR for short) of a fifth generation mobile communication technology (5 Generation, 5G) network supports multiple sub carrier spacings (SCSs), which is different from a long term evolution (LTE) network which only supports a single SCS.

When multiple SCSs exist in the NR and different terminal apparatuses, such as user equipment (UE), need to use resources with different SCSs, the NR must support synchronization of resources with different SCSs, and the problem of how to support synchronization of resources with different SCSs is not solved.

SUMMARY

Embodiments of the application provide a synchronization method and a terminal apparatus for solving the issue of how to support synchronization of resources with different SCSs.

In a first aspect, a synchronization method is provided. The synchronization method includes:
  determining, by a terminal apparatus, a type of synchronization sources; the synchronization sources including one or more combinations of:
    a base station in a long term evolution (LTE) network;
    a base station in the fifth generation mobile communication technology (5G) network;
    a global navigation satellite system (GNSS); and
    a communication node;
  determining, by the terminal apparatus, a synchronization source of the terminal apparatus from one or more synchronization sources matching the type; and
  synchronizing, by the terminal apparatus, with the determined synchronization source.

In embodiments of the application, multiple synchronization sources exist in aggregated carriers. Embodiments of the application provide a new synchronization mechanism. In the LTE network, a sub carrier spacing is of M×15 kHz. The synchronization sources in embodiments of the application may be from the LTE network, or from one or more of a 5G network, a GNSS, or a communication node. When resources with different SCSs are used, the terminal apparatus may determine the specific type of synchronization sources to be used based on the synchronization mechanism provided in the embodiments of the application, so as to improve synchronization accuracy as much as possible.

Optionally, the one or more synchronization sources matching the type are one or more base stations in the LTE network and/or the 5G network, the terminal apparatus can directly synchronize with the one or more synchronization sources, and the step of determining, by the terminal apparatus, the synchronization source from the one or more synchronization sources, includes:
  searching, by the terminal apparatus, a downlink synchronization signal according to a frequency band configured for the terminal apparatus and a sub carrier spacing (SCS) in downlink synchronization information corresponding to the frequency band; and
  determining, by the terminal apparatus, the synchronization source from the one or more synchronization sources according to the searched downlink synchronization signal and a preset parameter.

The preset parameter at least includes one or more combinations of the following parameters:
  a receiving power of the downlink synchronization signal;
  a synchronization offset between a base station and a GNSS;
  the frequency band configured for the terminal apparatus, and a timing offset and/or a frequency offset of SCS signal transmission in the downlink synchronization information corresponding to the frequency band; and
  reliability of service transmission of the terminal apparatus.

The reliability is configured to indicate one or more of a timing offset, a frequency offset, oxygen absorption loss influence, and rain attenuation influence of signal transmission in a frequency band corresponding to a service.

The optional mode describes factors which may be considered by a synchronization mechanism provided in embodiments of the application, such as the receiving power of the downlink synchronization signal, and the synchronization offset between the base station and the GNSS, etc. . . . . According to embodiments of the application, when the synchronization source is determined, the foregoing preset parameters are considered, so that the determined synchronization source may synchronize with the terminal apparatus, and the synchronization precision is high.

Optionally, the preset parameter is the receiving power of the downlink synchronization signal, and the step of determining, by the terminal apparatus, the synchronization source from the one or more synchronization sources according to the searched downlink synchronization signal and the preset parameters, includes:
  determining, by the terminal apparatus, a synchronization signal of which a receiving power is greater than a receiving power of the SCS in the downlink synchronization information corresponding to the frequency band configured for the terminal apparatus; and
  determining, by the terminal apparatus, a synchronization source corresponding to the determined synchronization signal as the synchronization source of the terminal apparatus.

Optionally, the preset parameter is the synchronization offset between the base station and the GNSS, and the step of determining, by the terminal apparatus, the synchronization source from the one or more synchronization sources according to the searched downlink synchronization signal and the preset parameter, includes:
  obtaining, by the terminal apparatus, at least one synchronization offset by receiving a synchronization offset between each of the one or more synchronization sources and the GNSS;
  selecting, by the terminal apparatus, a synchronization offset within a first preset range from the at least one synchronization offset; and determining, by the terminal apparatus, a synchronization source corresponding to the selected synchronization offset as the synchronization source of the terminal apparatus.

Optionally, the preset parameter is the frequency band configured for the terminal apparatus and the timing offset and/or frequency offset of signal transmission of the SCS in the downlink synchronization information corresponding to the frequency band, the step of determining, by the terminal apparatus, the synchronization source from the one or more synchronization sources according to the searched downlink synchronization signal and the preset parameter, includes:

determining, by the terminal apparatus, a timing offset and/or a frequency offset of transmission over a high-frequency sub carrier; the high frequency sub carrier being obtained by frequency doubling a low-frequency synchronization signal; and determining, by the terminal apparatus, a synchronization source corresponding to the low-frequency synchronization signal as the synchronization source of the terminal apparatus when a synchronization offset indicated by the timing offset and/or the frequency offset of transmission over the high-frequency sub carrier is greater than a first preset threshold.

Optionally, the preset parameter is the reliability of service transmission of the terminal apparatus, and the step of determining, by the terminal apparatus, the synchronization source from the one or more synchronization sources according to the searched downlink synchronization signal and the preset parameter, includes:

determining, by the terminal apparatus, that a synchronization offset indicated by a timing offset and/or a frequency offset of transmission over a high-frequency sub carrier obtained by frequency doubling a low-frequency synchronization signal is greater than a synchronization offset of a synchronization signal obtained by the terminal apparatus in a high frequency band; and determining, by the terminal apparatus, a synchronization source corresponding to the synchronization signal obtained in the high frequency band as the synchronization source of the terminal apparatus when the reliability of service transmission of the synchronization signal obtained in the high frequency band meets a preset condition.

The foregoing four optional solutions describe how the terminal apparatus in embodiments of the application determines the synchronization source to be used based on the preset parameter(s), and thus, when the determined synchronization source synchronizes with the terminal apparatus, the synchronization precision is high.

Optionally, the one or more synchronization sources matching the type are one or more base stations in the LTE network and/or the 5G network, the terminal apparatus cannot directly synchronize with the one or more synchronization sources, and the step of determining, by the terminal apparatus, the synchronization source from the one or more synchronization sources includes:

selecting, by the terminal apparatus, the synchronization source of the terminal apparatus from a GNSS connected with the terminal apparatus;

or, determining, by the terminal apparatus, the synchronization source of the terminal apparatus from communication nodes which can directly synchronize with one or more base stations in the LTE network and/or the 5G network.

Optionally, the one or more synchronization sources are one or more GNSSs and one or more communication nodes, the terminal apparatus cannot directly synchronize with the GNSSs and the communication nodes, and the step of determining, by the terminal apparatus, the synchronization source from the one or more synchronization sources matching the type includes:

determining, by the terminal apparatus, the synchronization source of the terminal apparatus from multiple communication nodes adjacent to the terminal apparatus.

Optionally, when multiple communication nodes exist, the step of determining, by the terminal apparatus, the synchronization source from the one or more synchronization sources matching the type, includes:

obtaining, by the terminal apparatus, multiple reference signal receiving powers (RSRPs) by acquiring an RSRP of a downlink synchronization signal of each of the multiple communication nodes;

determining, by the terminal apparatus, a maximum RSRP from the multiple RSRPs; and determining, by the terminal apparatus, a communication node corresponding to a downlink synchronization signal corresponding to the maximum RSRP as the synchronization source of the terminal apparatus;

or, selecting, by the terminal apparatus, at least one RSRP greater than a second preset threshold from the multiple RSRPs; and determining, by the terminal apparatus, a communication node corresponding to a downlink synchronization signal with a minimum synchronization offset from multiple downlink synchronization signals corresponding to the at least one RSRP as the synchronization source of the terminal apparatus.

The foregoing three optional solutions describe how the terminal apparatus in embodiments of the present application determines the synchronization source of the terminal apparatus from the one or more synchronization sources according to the type of the synchronization sources of a configured technology. In embodiments of the application, the synchronization source may be from the LTE network, and may also be from one or more of the 5G network, the GNSS, or the communication node. The terminal apparatus in the embodiments of the application may preferentially select the type of the synchronization sources and then select the specific synchronization source according to the three optional solutions, so as to improve the precision of synchronization between the selected synchronization source and the terminal apparatus as much as possible.

Optionally, the step of synchronizing, by the terminal apparatus, with the determined synchronization source includes:

selecting, by the terminal apparatus, a first synchronization source from the determined synchronization source when the terminal apparatus only can support maintenance of one synchronization source, stability of a synchronization signal of the first synchronization source meeting a preset condition; and synchronizing, by the terminal apparatus, with the first synchronization source by configuration of a frequency band and a SCS which have a minimum timing offset.

Optionally, the step of synchronizing, by the terminal apparatus, with the determined synchronization source includes:

selecting, by the terminal apparatus, multiple synchronization sources from the determined synchronization source when the terminal apparatus can support maintenance of at least two synchronization sources, stability of synchronization signals of the multiple synchronization sources meeting a preset condition; and synchronizing, by the terminal apparatus, with the multiple synchronization sources by configuration of multiple frequency bands and SCSs which have a minimum timing offset.

The two optional solutions describe how the terminal apparatus synchronizes with the determined synchronization source. Embodiments of the application propose that the terminal apparatus may determine how to synchronize with the synchronization source(s) according to the self capability, namely the capability of only supporting maintenance of one synchronization source or supporting maintenance of multiple synchronization sources.

In a second aspect, a terminal apparatus is provided, the terminal apparatus includes:

a memory, configured to store instructions; and a processor, configured to read the instructions in the memory, and execute the following processes:

determining a type of synchronization sources, the synchronization sources including one or more combinations of:
   a base station in a long term evolution (LTE) network,
   a base station in a fifth generation mobile communication technology (5G) network,
   a global navigation satellite system (GNSS); and
   a communication node;

determining, from one or more synchronization sources matching the type, a synchronization source of the terminal apparatus; and synchronizing with the determined synchronization source.

The terminal apparatus further includes a transceiver configured to receive and transmit data under the control of the processor.

Optionally, the one or more synchronization sources are one or more base stations in the LTE network and/or the 5G network, the terminal apparatus can directly synchronize with the one or more synchronization sources, and the processor is configured to:

search a downlink synchronization signal according to a frequency band configured for the terminal apparatus and a sub carrier spacing (SCS) in downlink synchronization information corresponding to the frequency band; and determine the synchronization source of the terminal apparatus from the one or more synchronization sources according to the searched downlink synchronization signal and a preset parameter.

The preset parameter at least includes one or more combinations of the following parameters:
   a receiving power of the downlink synchronization signal;
   a synchronization offset between a base station and a GNSS;
   the frequency band configured for the terminal apparatus, and a timing offset and/or a frequency offset of SCS signal transmission in downlink synchronization information corresponding to the frequency band; and
   reliability of service transmission of the terminal apparatus.

The reliability is configured to indicate one or more of a timing offset, a frequency offset, oxygen absorption loss influence, and rain attenuation influence of signal transmission in a frequency band corresponding to a service.

Optionally, the preset parameter is the receiving power of the downlink synchronization signal, and the processor is configured to:

determine a synchronization signal of which a receiving power is greater than a receiving power of the SCS in the downlink synchronization information corresponding to the frequency band configured for the terminal apparatus; and determine a synchronization source corresponding to the determined synchronization signal as the synchronization source of the terminal apparatus.

Optionally, the preset parameter is the synchronization offset between the base station and the GNSS, and the processor is configured to:

obtain at least one synchronization offset by receiving a synchronization offset between each of the one or more synchronization sources and the GNSS through a receiver;

select a synchronization offset within a first preset range from the at least one synchronization offset; and determine a synchronization source corresponding to the selected synchronization offset as the synchronization source of the terminal apparatus.

Optionally, the preset parameter is the frequency band configured for the terminal apparatus and the timing offset and/or frequency offset of SCS signal transmission in the downlink synchronization information corresponding to the frequency band, and the processor is configured to:

determine a timing offset and/or a frequency offset of transmission over a high-frequency sub carrier; the high-frequency sub carrier is obtained after frequency doubling of a low-frequency synchronization signal; and determine a synchronization source corresponding to the low-frequency synchronization signal as the synchronization source of the terminal apparatus when a synchronization offset indicated by the timing offset and/or the frequency offset of transmission over the high-frequency sub carrier is greater than the first preset threshold.

Optionally, the preset parameter is the reliability of service transmission of the terminal apparatus, and the processor is configured to:

determine that a synchronization offset indicated by a timing offset and/or a frequency offset of transmission over a high-frequency sub carrier obtained after frequency doubling of the low-frequency synchronization signal is greater than a synchronization offset of a synchronization signal obtained by the terminal apparatus in a high-frequency frequency band; and determine a synchronization source corresponding to the synchronization signal obtained in the high frequency band as the synchronization source of the terminal apparatus when the reliability of service transmission of the synchronization signal obtained in the high frequency band meets a preset condition.

Optionally, the one or more synchronization sources are one or more base stations in the LTE network and/or the 5G network, the terminal apparatus cannot directly synchronize with the one or more synchronization sources, and the processor is configured to:

select the synchronization source of the terminal apparatus from a GNSS connected with the terminal apparatus; or, determine the synchronization source of the terminal apparatus from communication nodes which can directly synchronize with the one or more base stations in the LTE network and/or the 5G network.

Optionally, the one or more synchronization sources are one or more GNSSs and one or more communication nodes, the terminal apparatus cannot directly synchronize with the GNSSs and the communication nodes, and the processor is configured to:

determine the synchronization source of the terminal apparatus from multiple communication nodes adjacent to the terminal apparatus.

Optionally, when multiple communication nodes exist, the processor is configured to:

obtain multiple reference signal receiving powers (RSRPs) by acquiring an RSRP of a downlink synchronization signal of each of the multiple communication nodes; and determine the maximum RSRP from the multiple RSRPs, and determine a communication node corresponding to a downlink synchronization signal corresponding to the maximum RSRP as the synchronization source of the terminal apparatus;

or, select at least one RSRP greater than a second preset threshold from the multiple RSRPs, and determine a communication node corresponding to a downlink synchronization signal with a minimum synchronization offset from multiple downlink synchronization signals corresponding to the at least one RSRP as the synchronization source of the terminal apparatus.

Optionally, the processor is configured to:

select a first synchronization source from the determined synchronization source when the terminal apparatus only can support maintenance of one synchronization source, the stability of a synchronization signal of the first synchronization source meeting a preset condition; and synchronize with the first synchronization source by configuration of a frequency band and a SCS which have a minimum timing offset.

Optionally, the processor is configured to:

select multiple synchronization sources from the determined synchronization sources when the terminal apparatus can support maintenance of at least two synchronization sources, the stability of synchronization signals of the multiple synchronization sources meeting a preset condition; and synchronize with the multiple synchronization sources by configuration of multiple frequency bands and SCSs which have a minimum timing offset.

The technical effects of the terminal apparatus provided by the embodiments of the application may be seen from the technical effects of various implementation modes of the first aspect, and will not be described in detail herein.

In a third aspect, a terminal apparatus is provided, and the terminal apparatus includes:

a first determination unit, configured to determine a type of synchronization sources, the synchronization sources including one or more combinations of:

a base station in a long term evolution (LTE) network, a base station in a fifth generation mobile communication technology (5G) network, a global navigation satellite system (GNSS), and a communication node;

a second determination unit, configured to determine, from one or more synchronization sources matching the type, a synchronization source of the terminal apparatus; and a synchronization unit, configured to synchronize with the determined synchronization source.

The technical effects of the terminal apparatus provided by embodiments of the application may be seen from the technical effects of various implementation modes of the first aspect, and will not be described in detail herein.

In a fourth aspect, a computer storage medium is provided, a computer program is stored on the computer storage medium, and the computer program implements, the method in the first aspect when being executed by the processor.

In embodiments of the present application, multiple synchronization sources exist in an aggregated carrier. Embodiments of the application provide a new synchronization mechanism, compared with the LTE network in which the sub carrier spacing is of M×15 kHz, the synchronization source in the embodiments of the application may be from the LTE network, and may also be from one or more of the 5G network, the GNSS or the communication node, and the terminal apparatus can determine the specific type of synchronization sources to be used, when resources having different SCSs are used, based on the synchronization mechanism provided by the embodiments of the application, so as to improve the synchronization precision as much as possible.

DETAILED DESCRIPTION OF THE EMBODIMENTS

In order to make the objectives, technical solutions and advantages of the present application more clearly understood, the technical solutions in the embodiments of the present application will be clearly and completely described below with reference to the drawings in the embodiments of the present application.

Backgrounds of embodiments of the present application are described below.

In a LTE vehicle-to-everything (V2X) system, due to the capability of a vehicle node to directly receive a global navigation satellite system (GNSS) signal, a vehicle node which directly acquires signals of a GNSS may send a SideLink Synchronization Signal (SLSS) and synchronization configuration information as a synchronization source.

Therefore, three synchronization modes including GNSS synchronization, eNB synchronization and terminal apparatus synchronization in a LTE network, such as inter-UE self-synchronization, are supported in a LTE-V2X protocol of 3GPP Rel-14, and only single carrier synchronization is considered. In the LTE-V2X protocol of 3GPP Rel-15, three synchronization modes including GNSS synchronization, eNB synchronization and inter-UE self-synchronization are still supported, but synchronization of at most 8 carriers is supported. In Rel-14/15, a fixed sub carrier spacing (SCS) is adopted.

However, in 5G NR V2X, GNSS synchronization may still be adopted in the vehicle node, gNB synchronization in a 5G network may also be considered, and self-synchronization between nodes such as UE or vehicle nodes may be carried out. 5G NR V2X supports a flexible sub carrier spacing (SCS), and may also support spectrum resources in different frequency bands, for example, the 5G NR V2X may support frequency bands higher than 6 GHz, so that multiple different frequency spectra may be supported; and the processing capacity of vehicle nodes may also be different, and therefore, the original synchronization flow of Rel-14/Rel-15 may not be directly used. If the backward compatibility of the 5G NR V2X to LTE-V2X is considered, five synchronization sources including the eNB of the LTE-V2X, the gNB of the 5G NR V2X, the GNSS, the node of the LTE-V2X such as self-synchronization of UE, and the node of the 5G NR V2X such as self-synchronization of a terminal apparatus and a vehicle node may exist in a network.

When multiple synchronization sources and multiple SCSs exist in the 5G NR V2X and different terminal apparatuses need to use resources with different SCSs, NR must support synchronization of the resources with the different SCSs, and the problem of how to support synchronization of resources with different SCSs has not yet been solved at present.

In view of this, embodiments of the application provide a new synchronization mechanism, and compared with the LTE network in which the sub carrier spacing is M×15 kHz, the synchronization source in the embodiments of the application may be from the LTE network, and may also be from one or more of a 5G network, a GNSS or a communication node, namely, in the embodiments of the application, multiple synchronization sources may exist in an aggregated carrier. Based on the synchronization mechanism provided by the embodiments of the application, the terminal apparatus can determine the specific type of used synchronization sources when resources with different SCSs are used so as to improve the synchronization precision as much as possible.

The technical solution provided by the embodiments of the application is described below with reference to the drawings in the description.

Figure 1:
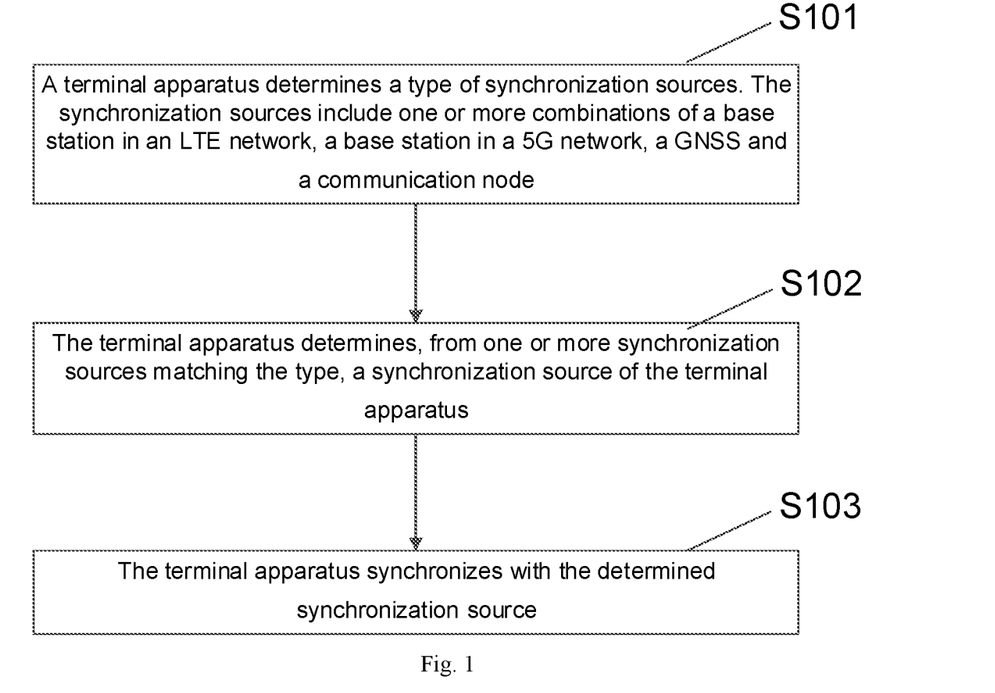
FIG. 1 is a flow diagram of a synchronization method provided by an embodiment of the present application.

Referring to FIG. 1, embodiments of the application provide a synchronization method which can be executed by a terminal apparatus. The terminal apparatus may be UE, a vehicle node or the like, and the specific flow of the synchronization method is described as follows.

S101, the terminal apparatus determines the type of synchronization sources. The synchronization sources include one or more combinations of a base station in an LTE network, a base station in a 5G network, a GNSS and a communication node.

S102, the terminal apparatus determines the synchronization source of the terminal apparatus from one or more synchronization sources matching the type.

S103, the terminal apparatus synchronizes with the determined synchronization source.

In 5G NR V2X, the synchronization source may be from the eNB in the LTE network, the gNB in the 5G network, the GNSS, a node in LTE-V2X such as UE, and a communication node in the 5G NR V2X such as a terminal apparatus and a vehicle node. It involves that the terminal apparatus preferably selects the type of synchronization sources, and then further selects the specific synchronization source. Therefore, the terminal apparatus may be configured with the type of the synchronization sources. The same kind of synchronization sources belongs to the same type, for example, the type of eNB and the type of gNB are the same, and the type of eNB or the type of gNB is different from the type of the GNSS. Along with difference of the types of the synchronization sources, the corresponding synchronization priorities are different. The terminal apparatuses are usually configured beforehand with different synchronization types, for example, if the synchronization source type with which the terminal apparatus is configured is a base station type, then the synchronization source of the base station type may be considered to be of higher priority than the synchronization source of the GNSS type. In a possible implementation mode, the type of synchronization sources of the terminal apparatus may be a fixed type configured in advance or a type dynamically configured by a base station through signaling.

When the terminal apparatus in embodiments of the application determines a synchronization source, the type of the synchronization source configured to the terminal apparatus may be determined firstly, and then the synchronization source of the terminal apparatus is determined from one or more synchronization sources matching the configured type.

Specifically, the step that the terminal apparatus determines one or more synchronization sources matching the configured type according to the configured type of the synchronization sources may include the following several situations.

A first situation: the type of the synchronization sources configured to the terminal apparatus is a base station type, and the terminal apparatus may be directly connected with the base station.

If the terminal apparatus determines that the configured type of the synchronization sources is a base station type, then the terminal apparatus may determine that one or more synchronization sources matching the configured type may be the eNBs in the LTE network, and may also be the gNBs in the 5G network, or the one or more synchronization sources may be the eNBs in the LTE network and the gNBs in the 5G network.

If the type of the synchronization source configured to the terminal apparatus is an eNB type, then the terminal apparatus determines that one or more synchronization sources matching the configured type are the eNBs in the LTE network. If the type of the synchronization source configured to the terminal apparatus is a gNB type, then the terminal apparatus determines that the one or more synchronization sources matching the configured type are the gNBs in the 5G network. If the type of the synchronization source configured to the terminal apparatus is the eNB type and the gNB type, then the terminal apparatus determines that the one or more synchronization sources matching the configured type are the eNBs in the LTE network and the gNBs in the 5G network.

A second situation: the type of the synchronization source configured to the terminal apparatus is a base station type, and the terminal apparatus cannot be directly connected with the base station and can be directly connected with a GNSS or a communication node connected with the base station.

In general, the eNB or gNB is preferably selected as a synchronization source by the terminal apparatus, however, it cannot be ensured that the eNB or the gNB can be successfully connected with the terminal apparatus directly all the time. If the eNB or the gNB also serves as a synchronization source, the eNB or the gNB does not necessarily receive the GNSS reliably, due to influence of transmission delay, a synchronization offset may exist between the terminal apparatus and a communication node synchronizing with the eNB or the gNB and between the terminal apparatus and the eNB or the gNB, and synchronization of nodes within network coverage may not be uniform, so the eNB or gNB is no longer suitable as a synchronization source.

Even if the terminal apparatus determines that the type of the synchronization source configured to the terminal apparatus is a base station type, the terminal apparatus determines that the one or more synchronization sources matching the configured type are GNSSs connected to the terminal apparatus, or the terminal apparatus determines that the one or more synchronization sources matching the configured type are communication nodes which can synchronize with base stations in an LTE network and/or a 5G network, such as another terminal apparatus or a vehicle node.

A third situation: the type of the synchronization source configured to the terminal apparatus is a base station type, and the terminal apparatus cannot be directly connected with the base station and cannot be directly connected with the GNSS and the communication node.

The terminal apparatus preferably selects the eNB or gNB as a synchronization source, however, it cannot be ensured that the eNB or the gNB can be successively connected with the terminal apparatus directly all the time, and then a GNSS or another communication node connected with the eNB or the gNB may be used as a synchronization source. However, it cannot be ensured that the terminal apparatus can be successfully connected with the GNSS or the other communication node directly all the time, thus the terminal apparatus may determine that the one or more synchronization sources matching the configured type are multiple communication nodes adjacent to the terminal apparatus, such as another terminal apparatus or a vehicle node.

A fourth situation: the type of the synchronization source configured to the terminal apparatus is a GNSS, and the base station can be directly connected to the GNSS.

In this situation, the terminal apparatus may determine that the one or more synchronization sources matching the configured type are the GNSSs connected with the terminal apparatus, so that the GNSS is directly determined to be used as the synchronization source, and a purpose of high synchronization precision is achieved.

A fifth situation: the type of the synchronization source configured to the terminal apparatus is a GNSS, and the base station cannot be directly connected to the GNSS.

It cannot be ensured that the terminal apparatus can be successfully connected with the GNSS all the time, therefore, the terminal apparatus may determine that one or more synchronization sources matching the configured type are multiple communication nodes adjacent to the terminal apparatus, such as another terminal apparatus or a vehicle node.

To sum up, if the type configured to the terminal apparatus is a base station type, the terminal apparatus can be directly connected with a base station, the terminal apparatus may determine that one or more synchronization sources are from a base station in an LTE network or a base station in a 5G network. Further, if the terminal apparatus cannot be directly connected with the base station in the LTE network and the base station in the 5G network, the terminal apparatus may try to synchronize with another terminal apparatus which is directly connected with a base station in an LTE network or a base station in a 5G network. Further, if the terminal apparatus cannot synchronize with the other terminal apparatus which is directly connected with the base station in the LTE network or the base station in the 5G network, then the terminal apparatus may try to synchronize with a GNSS. Further, if the terminal apparatus cannot synchronize with the GNSS, then the terminal apparatus may try to synchronize with multiple communication nodes adjacent to the terminal apparatus, such as another terminal apparatus or a vehicle node.

According to the embodiments of the present application, one or more synchronization sources matching the configured type are selected according to the type of the synchronization sources configured to the terminal apparatus, namely, the priority of selecting the synchronization source is indicated, and the terminal apparatus in the embodiments of the present application may preferentially select the type of synchronization sources according to the foregoing five optional solutions and then select the specific synchronization source, so as to improve the precision of synchronization of the selected synchronization source and the terminal apparatus as much as possible.

In the embodiments of the present application, after the terminal apparatus determines one or more synchronization sources, the synchronization source to be used for synchronizing with the terminal apparatus is further determined so as to ensure the synchronization precision as much as possible.

Specifically, during selection of the synchronization source for the terminal apparatus, the synchronization precision needs to be considered, and furthermore, the reliability, stability and the like of signal transmission in a frequency band corresponding to a synchronization signal need to be considered.

In the embodiments of the present application, according to the difference of the one or more synchronization sources matching the type configured to the terminal apparatus, the determination of the synchronization sources for synchronizing with the terminal apparatus is also different, which will be respectively introduced as follows.

A first determination method: the first determination method is used for the first situation, namely, the terminal apparatus determines that one or more synchronization sources are one or more base stations.

1. If the terminal apparatus is configured to only synchronize with the base station in the LTE network, the synchronization flow is the same as that of a LTE-V2X protocol in the prior art, and will not be described in detail herein.

2. If the terminal apparatus is configured to only synchronize with the gNB in the 5G network, namely, one or more synchronization sources are the gNB(s) in the 5G network, and the terminal apparatus can synchronize with the the one or more synchronization sources directly.

In this case, when the terminal apparatus determines synchronization source(s) to be synchronized from the one or more synchronization sources, downlink synchronization signals of the gNB(s) may be searched according to a frequency band configured for the terminal apparatus and a sub carrier spacing (SCS) in downlink synchronization information corresponding to the frequency band, to obtain synchronization information. The terminal apparatus determines the synchronization source(s) of the terminal apparatus from the one or more synchronization sources according to the searched downlink synchronization signals. The terminal apparatus may select the synchronization source(s) based on preset parameters of one or more combinations of the following several parameters, the preset parameters may be considered as factors considered when a synchronization source is determined for the terminal apparatus, and the terminal apparatus may determine the synchronization source(s) based on the following one preset parameter or the following multiple preset parameters.

In a possible implementation mode, the preset parameters may be:

(1) a receiving power of the downlink synchronization signal;

(2) a synchronization offset between the base station and the GNSS;

(3) the frequency band configured for the terminal apparatus and a timing offset and/or a frequency offset of SCS signal transmission in the downlink synchronization information corresponding to the frequency band; and (4) reliability of service transmission of the terminal apparatus, the reliability is configured to indicate one or more of a timing offset, a frequency offset, oxygen absorption loss influence, and rain attenuation influence of signal transmission in a frequency band corresponding to a service.

According to difference of the preset parameters, modes for determining the synchronization source by the terminal apparatus are also different, and are respectively described below.

Mode (1)

If the terminal apparatus determines the synchronization source based on the preset parameter (1), then the terminal apparatus may determine the receiving powers of searched downlink synchronization signals of gNB(s) to obtain multiple receiving powers. Along with increasing of the receiving powers of the downlink synchronization signals, it may be considered that the stability of signal transmission in the frequency band corresponding to the downlink synchronization signals is increased constantly. Therefore, in the embodiments of the present application, the terminal apparatus may select one or more larger receiving powers from the multiple receiving powers, and the selected one or more receiving powers are greater than the receiving power of the SCS in the downlink synchronization information corresponding to the frequency band configured for the terminal apparatus. The terminal apparatus may further determine a synchronization source to be synchronized from the synchronization sources corresponding to the downlink synchronization signals corresponding to the selected one or more receiving powers. The terminal apparatus may select the synchronization source of the downlink synchronization signal corresponding to the maximum receiving power from the one or more receiving powers as the synchronization source to be synchronized. Or, the terminal apparatus may select a synchronization source of the downlink synchronization signal corresponding to any receiving power from the one or more of the receiving powers as a synchronization source to be synchronized, so as to ensure synchronization accuracy and stability or reliability of signal transmission as much as possible.

Mode (2)

If only the preset parameter (2), namely the synchronization offset between the base station and the GNSS, is only considered when the terminal apparatus determines the synchronization source, the terminal apparatus may still search downlink synchronization signals of gNBs, when the multiple gNBs may synchronize with the GNSS, each gNB in the multiple gNBs can send the synchronization offset between the gNB and the GNSS to the terminal apparatus, so that the terminal apparatus obtains the synchronization offset between each gNB and the GNSS, namely multiple synchronization offsets. Furthermore, the terminal apparatus may select the synchronization offset within a first preset range from the multiple synchronization offsets, and determine a synchronization source corresponding to the selected synchronization offset as the synchronization source of the terminal apparatus.

The first preset range may be a synchronization error range which can be accepted by the terminal apparatus for synchronization. If multiple synchronization offsets are in the first preset range, the terminal apparatus may select a synchronization source corresponding to any synchronization offset from the multiple synchronization offsets and determine the synchronization source as the synchronization source of the terminal apparatus, or, the terminal apparatus may also select a synchronization source corresponding to the minimum synchronization offset from the multiple synchronization offsets and determine the synchronization source as the synchronization source of the terminal apparatus.

Mode (3):

If only the preset parameter (3) is considered when the terminal apparatus determines the synchronization source, namely, influences of the frequency band and the SCS which are configured for the terminal apparatus are considered, the terminal apparatus may also search the downlink synchronization signals of the multiple gNBs. Due to the influence of the high frequency doubling error, after frequency doubling of low-frequency signals with the same timing source/the same offset and during transmission of high-frequency sub carriers, the timing offset or the frequency offset is greater than the timing offset or the frequency offset during transmission of low-frequency sub-carriers, thus, during transmission of high-frequency signals, influences by phase noises and propagation are larger, and the reliability is lower.

Therefore, in the embodiments of the present application, the terminal apparatus may determine the timing offset and/or the frequency offset of transmission over high-frequency sub carriers, the high frequency sub carrier being obtained after frequency doubling of the low-frequency synchronization signal, and further determine whether to use the low-frequency synchronization signal or the high-frequency synchronization signal according to the determined timing offset and/or the frequency offset.

Specifically, if the timing offset determined by the terminal apparatus is greater than a first preset threshold, it can be considered that the reliability of signal transmission is low if the terminal apparatus adopts the high-frequency synchronization signal. The first preset threshold may be the maximum allowable timing offset. In this condition, the terminal apparatus may determine a synchronization source corresponding to the low-frequency synchronization signal as the synchronization source of the terminal apparatus, namely, it determines that the low-frequency synchronization signal is adopted.

Similarly, if the frequency offset determined by the terminal apparatus is greater than a first preset threshold, it may be considered that the reliability of signal transmission is low if the terminal apparatus adopts the high-frequency synchronization signal, the first preset threshold may be the maximum allowable frequency offset. In this condition, the terminal apparatus may determine a synchronization source corresponding to the low-frequency synchronization signal as the synchronization source of the terminal apparatus, namely, it determines that the low-frequency synchronization signal is adopted. Here, the first preset threshold may be different from the foregoing first preset threshold.

Of course, the terminal apparatus in the embodiments of the present application may determine the synchronization source in consideration of both the timing offset and the frequency offset, and it is similar to the above modes, and will not be described in detail herein.

Mode (4):

If only the preset parameter (4) is considered when the terminal apparatus determines the synchronization source, namely, the frequency band, for service sending, of the terminal apparatus is considered, the terminal apparatus may still search the downlink synchronization signals of the multiple gNBs. If the low-frequency synchronization signal reaches a high frequency band for service sending after being subjected to frequency doubling, the synchronization offset of the low-frequency synchronization signal is greater than the synchronization offset of the synchronization signal obtained in the high frequency band, and at the moment, if the low-frequency synchronization signal is adopted as a synchronization signal, the reliability of service transmission of the terminal apparatus is lower. Of course, in addition to determine the reliability of service transmission of the terminal apparatus based on the timing deviation and/or the frequency deviation of signal transmission in a frequency band corresponding to service in the embodiments of the present application, the influences of oxygen absorption loss, rain attenuation and the like on the reliability may further be considered.

Based on the situation that if the low-frequency synchronization signal is used as a synchronization signal, then the reliability of service transmission of the terminal apparatus is low, if the terminal apparatus in the embodiments of the present application determines that synchronization offset indicated by the timing offset and/or frequency offset of transmission of high-frequency sub carriers obtained after frequency doubling of the low-frequency synchronization signal is greater than the synchronization offset of a synchronization signal which is obtained by the terminal apparatus in a high frequency band, then the terminal apparatus determines a synchronization source corresponding to the high-frequency synchronization signal as the synchronization source of the terminal apparatus under the condition that the precision and/or stability of service transmission of the high-frequency synchronization signal can meet requirements.

When the terminal apparatus in the embodiments of the present application determines the synchronization source, any one or more combinations of the four preset parameters may be considered, and similarly, a synchronization determining mode may correspond to combination of the foregoing four modes.

3. If the terminal apparatus is configured to synchronize with both the eNB in the LTE network and the gNB in the 5G network, namely, one or more synchronization sources are the eNB(s) in the LTE network and the gNB(s) in the 5G network, then the terminal apparatus can directly synchronize with the one or more synchronization sources.

In this case, when the terminal apparatus determines a synchronization source to be synchronized from the one or more synchronization sources, downlink synchronization signals of multiple eNBs and multiple gNBs may be searched to obtain synchronization information according to a frequency band configured for the terminal apparatus and a sub carrier spacing (SCS) in downlink synchronization information corresponding to the frequency band. The terminal apparatus determines the synchronization source of the terminal apparatus from the one or more synchronization sources according to the searched downlink synchronization signals.

Correspondingly, the searched downlink synchronization signals are downlink synchronization signals of the multiple eNBs and the multiple gNBs, and the mode (1) is the same as the mode (1) in the foregoing 2. The mode (2) corresponds to the mode (2) in the foregoing 2, the synchronization offset between the eNB and the GNSS and the synchronization offset between the gNB and the GNSS are considered in the terminal apparatus, the mode (2) in the foregoing 2 may be referred to, and it is not repeated herein. The mode (3) is the same as the mode (3) in the foregoing 2, the mode (4) is the same as the mode (4) in the foregoing 2, and it is not repeated herein.

A second determination mode: the second determination mode is used for the terminal apparatus to determine that one or more synchronization sources are the GNSS(s).

The terminal apparatus cannot be directly connected with the base station(s) in the LTE network terminal and the 5G network, and then the terminal apparatus may try to synchronize with the GNSS which can be directly connected with the terminal apparatus. The terminal apparatus may select one of GNSSs connected to the terminal apparatus as a synchronization source.

A third determination mode: the third determination mode is used for the terminal apparatus to determine that one or more synchronization sources are communication node(s) directly connected with the base station, such as another terminal apparatus or a vehicle mode.

The terminal apparatus cannot be directly connected with the base station in the LTE network terminal and the base station in the 5G network, and then the terminal apparatus may try to synchronize with another communication node which can be directly connected with the base station, such as another terminal apparatus, namely, the terminal apparatus may select one terminal apparatus from other terminal apparatuses as a synchronization source.

Specifically, the terminal apparatus may acquire a reference signal receiving power (RSRP) of a downlink synchronization signal of each of multiple communication nodes to obtain multiple RSRPs. The terminal apparatus may select a communication node corresponding to the RSRP meeting a preset condition from the multiple RSRPs as the synchronization source of the terminal apparatus.

In a possible implementation mode, the terminal apparatus may determine the maximum RSRP from the multiple RSRPs, and determine a communication node corresponding to a downlink synchronization signal corresponding to the maximum RSRP as the synchronization source of the terminal apparatus.

Or, in a possible implementation mode, the terminal apparatus may select at least one RSRP greater than a second preset threshold from the multiple RSRPs, and determine a communication node corresponding to the downlink synchronization signal with the minimum synchronization offset from the multiple downlink synchronization signals corresponding to the at least one RSRP as the synchronization source of the terminal apparatus. If the RSRP of one downlink synchronization signal is greater than the second preset threshold, the reliability of transmission may be ensured as much as possible when signals are transmitted by adopting a frequency band corresponding to the downlink synchronization signal. On the premise, the communication node corresponding to the downlink synchronization signal with the minimum synchronization offset is selected and determined as the synchronization source of the terminal apparatus, so that the synchronization precision may be ensured as much as possible.

A fourth determination mode: the fourth determination mode is used for the terminal apparatus to determine that one or more synchronization sources are from communication nodes adjacent to the terminal apparatus, such as another terminal apparatus or a vehicle node.

The fourth determination mode is similar to the third determination mode, reference can be made to the third determination mode, and the fourth determination mode will not be repeated herein.

The terminal apparatus may determine the synchronization source through the first determination mode to the fourth determination mode, and after the terminal apparatus determines the synchronization source, synchronization can be carried out according to the determined synchronization source. In the embodiments of the present application, the synchronization modes of the terminal apparatus are different according to different capabilities of the terminal apparatus, and the synchronization modes are respectively introduced below.

A first synchronization mode: the first synchronization mode is used for the terminal apparatus which only can support maintenance of one synchronization source.

If the terminal apparatus determines multiple synchronization sources and only can support maintenance of one synchronization source, then the terminal apparatus may select a first synchronization source from the multiple determined synchronization sources. The stability of a synchronization signal of the first synchronization source meets a preset condition, that is, the synchronization signal of the first synchronization source selected by the terminal apparatus meets the stability and reliability of signal transmission. After the terminal apparatus determines the first synchronization source, the terminal apparatus may synchronize with the first synchronization source by configuration of a frequency band and a SCS which have the minimum timing offset during synchronization. That is, the terminal apparatus may take configuration of the frequency band and the SCS which have the minimum timing offset of the first synchronization source as a follow-up synchronization signal acquisition mode, and continuously maintain the synchronization signal. Maintenance of the synchronization signal includes information of the frequency band, the SCS, timing, timing offset and corresponding synchronization sources such as the eNB or gNB.

A second synchronization mode: the second synchronization mode is used for the terminal apparatus which can support maintenance of multiple synchronization sources.

If the terminal apparatus determines multiple synchronization sources and can support maintenance of at least two synchronization sources, the terminal apparatus may select at least two synchronization sources from the multiple determined synchronization sources. The stability of the synchronization signals of the at least two synchronization sources meets a preset condition, that is, the synchronization signal of each synchronization source selected by the terminal apparatus meets the stability and reliability of signal transmission. After the terminal apparatus determines the at least two synchronization sources, the terminal apparatus may synchronize with the at least two synchronization sources by configuration of multiple frequency bands and SCSs which have the minimum timing offset during synchronization. That is, the terminal apparatus may take configuration of the frequency bands and the SCSs which have the minimum timing offset of at least two synchronization sources such as at least two gNBs or eNBs as a follow-up synchronization signal acquisition mode, and continuously maintain the synchronization signal. Similarly, maintenance of the synchronization signal includes information of the frequency bands, the SCSs, timing, timing offset and corresponding synchronization sources such as the eNB or gNB.

In summary, the embodiments of the present application provide a new synchronization mechanism which is suitable for the situation that multiple synchronization sources exist in an aggregated carrier. Compared with an LTE network in which the sub carrier spacing is M×15 kHz, the synchronization source in the embodiments of the present application may be from an LTE network or one or more of a 5G network, a GNSS or a communication node, and the terminal apparatus may determine the specific type of used synchronization sources when resources having different SCSs are used based on the synchronization mechanism provided by the embodiments of the present application, so as to improve the synchronization precision as much as possible.

According to the embodiments of the present application, the synchronization source is determined based on the capability of the terminal apparatus, the receiving power of the synchronization signal, the synchronization precision and the influences of SCS, the frequency band and the like so as to further improve the synchronization precision.

The terminal apparatus provided by the embodiments of the present application is described below with reference to the figures in the description.

Figure 2:
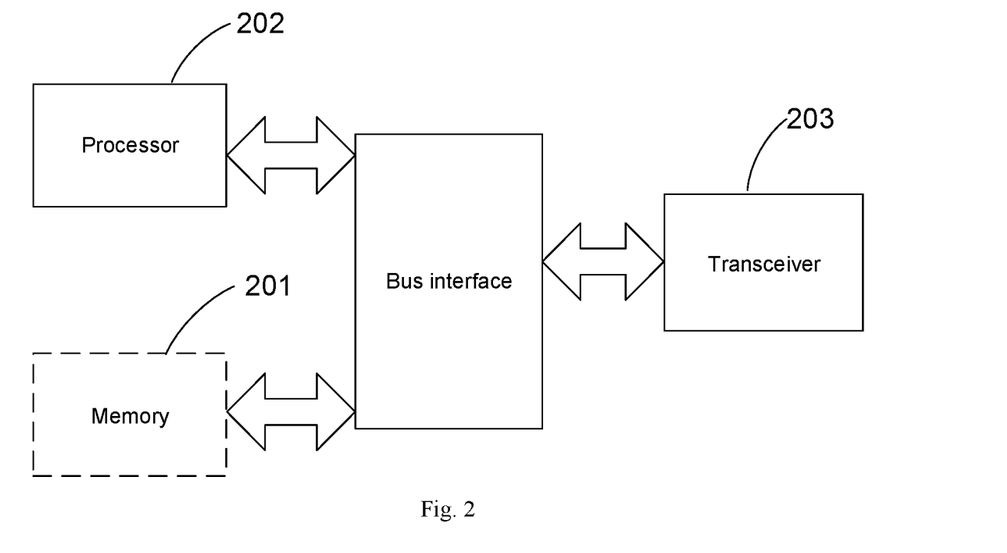
FIG. 2 is a structure diagram of a terminal apparatus provided by an embodiment of the present application.

Referring to FIG. 2, based on the same inventive concept, embodiments of the present application provide a terminal apparatus which may be UE, a vehicle and the like, and the terminal apparatus may include a memory 201, a processor 202 and a transceiver 203. The memory 201 and the transceiver 203 may be connected to the processor 202 via a bus interface (as exemplified in FIG. 2) or may be connected to the processor 202 via special connection lines.

The memory 201 may be configured to store programs, and the transceiver 203 is configured to transmit and receive data under the control of the processor 202. The processor 202 may be configured to read programs in the memory 201, and execute the following processes.

The type of synchronization sources is determined, the synchronization sources include one or more combinations of a base station in an LTE network, a base station in a 5G network, a GNSS and a communication node.

The synchronization source of the terminal apparatus is determined from one or more synchronization sources matching the type.

The determined synchronization source is synchronized with the terminal apparatus.

Optionally, the processor 202 is configured to:

if the one or more synchronization sources are one or more base stations in the LTE network and/or the 5G network, and the terminal apparatus can directly synchronize with the one or more synchronization source, then:

search a downlink synchronization signal according to a frequency band configured for the terminal apparatus and a sub carrier spacing (SCS) of downlink synchronization information corresponding to the frequency band; and determine the synchronization source of the terminal apparatus from the one or more synchronization sources according to the searched downlink synchronization signal and a preset parameter.

The preset parameter at least includes one or more combinations of the following several parameters:

a receiving power of a downlink synchronization signal;

a synchronization offset between the base station and the GNSS;

a frequency band configured for the terminal apparatus, and a timing offset and/or a frequency offset of SCS signal transmission in downlink synchronization information corresponding to the frequency band; and reliability of service transmission of the terminal apparatus, the reliability is configured to indicate one or more of a timing offset, a frequency offset, oxygen absorption loss influence, and rain attenuation influence of signal transmission in the frequency band corresponding to a service.

Optionally, if the preset parameter is the receiving power of the downlink synchronization signal, the processor 202 is configured to:

determine a synchronization signal of which the receiving power is greater than the receiving power of the SCS in the downlink synchronization information corresponding to the frequency band configured for the terminal apparatus; and determine a synchronization source corresponding to the determined synchronization signal as the synchronization source of the terminal apparatus.

Optionally, if the preset parameter is the synchronization offset between the base station and the GNSS, the processor 202 is configured to:

obtain at least one synchronization offset by receiving a synchronization offset between each of the one or more synchronization sources and the GNSS through a receiver;

select a synchronization offset within a first preset range from the one or more synchronization offsets; and determine the synchronization source corresponding to the selected synchronization offset as the synchronization source of the terminal apparatus.

Optionally, if the preset parameter is the frequency band configured for the terminal apparatus and timing offset and/or frequency offset of SCS signal transmission in the downlink synchronization information corresponding to the frequency band, the processor 202 is configured to:

determine a timing offset and/or a frequency offset of transmission over a high-frequency sub carrier obtained after frequency doubling of a low-frequency synchronization signal; and determine the synchronization source corresponding to the low-frequency synchronization signal as the synchronization source of the terminal apparatus if the synchronization offset indicated by the timing offset and/or the frequency offset of transmission over the high-frequency sub carrier is greater than the first preset threshold.

Optionally, if the preset parameter is the reliability of service transmission of the terminal apparatus, the processor 202 is configured to:

determine that a synchronization offset indicated by a timing offset and/or a frequency offset of transmission over a high-frequency sub carrier obtained after frequency doubling of the low-frequency synchronization signal is greater than a synchronization offset of the synchronization signal obtained by the terminal apparatus in the high frequency band; and determine a synchronization source corresponding to the synchronization signal obtained in the high frequency band as the synchronization source of the terminal apparatus when the reliability of service transmission of the synchronization signal obtained in the high frequency band meets a preset condition.

Optionally, the processor 202 is configured to:

if the one or synchronization sources are from a base station in an LTE network and/or a base station in a 5G network, the terminal apparatus cannot directly synchronize with the one or synchronization sources, then:

select the synchronization source of the terminal apparatus from the GNSS connected with the terminal apparatus;

or, determine the synchronization source of the terminal apparatus from communication nodes which can directly synchronize with the base station in the LTE network and/or the base station in the 5G network.

Optionally, the processor 202 is specifically to:

if the one or more synchronization sources are from the GNSS and the communication node, and the terminal apparatus cannot directly synchronize with the GNSS and the communication node, then:

determine the synchronization source of the terminal apparatus from multiple communication nodes adjacent to the terminal apparatus.

Optionally, if multiple communication nodes exist, the processor 202 is configured to:

acquire a reference signal receiving power (RSRP) of a downlink synchronization signal of each of the multiple communication nodes to obtain multiple RSRPs;

determine the maximum RSRP from the multiple RSRPs, and determine a communication node corresponding to the downlink synchronization signal corresponding to the maximum RSRP as the synchronization source of the terminal apparatus;

or, select at least one RSRP greater than a second preset threshold from the multiple RSRPs, and determine a communication node corresponding to the downlink synchronization signal with the minimum synchronization offset from multiple downlink synchronization signals corresponding to the at least one RSRP as the synchronization source of the terminal apparatus.

Optionally, the processor 202 is configured to:

select a first synchronization source from the determined synchronization source if the terminal apparatus only can support maintenance of one synchronization source, herein the stability of the synchronization signal of the first synchronization source meets a preset condition; and synchronize with the first synchronization source by configuration of a frequency band and a SCS which have the minimum timing offset.

Optionally, the processor 202 is configured to:

select multiple synchronization sources from the determined synchronization sources if the terminal apparatus only can support maintenance of at least two synchronization sources, wherein the stability of synchronization signals of the multiple synchronization sources meet a preset condition; and synchronize with the multiple synchronization sources by configuration of multiple frequency bands with the minimum timing offset and multiple SCSs with the minimum timing offset.

Optionally, the processor 202 may be specifically a central processing unit and an application specific integrated circuit (called ASIC for short), and may be one or more integrated circuits for controlling execution of a program.

In FIG. 2, a bus architecture may include any numbers of buses and bridges which are interconnected, specifically, the buses and the bridges are linked together by various circuits of one or more processors such as the processor 202 and a memory such as the memory 201. The bus architecture may further link various other circuits together, such as peripheral equipment, voltage regulators and power management circuits, these are well known in the art, and therefore will not be described any further herein. An interface is provided by a bus interface. A transceiver 203 may be multiple elements, namely, the transceiver 203 includes a transmitter and a receiver, and units which communicate with other apparatuses on a transmission medium is provided. The processor 202 is responsible for management of the bus architecture and general processing, and the memory 201 may store data associated with the processor 202 during operation of the processor 202.

Optionally, the memory 201 may include a read only memory (called ROM for short), a random access memory (called RAM for short) and a magnetic disk memory. The memory 201 is configured to store data required during running of the processor 202, namely, instructions which can be executed by at least one processor 202 are stored, and at least one processor 202 executes the method shown as FIG. 1 by executing the instructions stored in the memory 201. One or more memories 201 exist. The memory 201 is also shown in FIG. 2, but it needs to be known that the memory 201 is not a necessary functional module and is therefore shown in dashed lines in FIG. 2.

Figure 3:
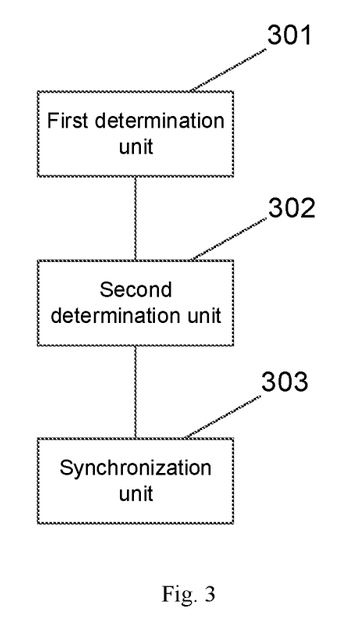
FIG. 3 is a structure diagram of another terminal apparatus provided by an embodiment of the present application.

Referring to FIG. 3, based on the same inventive concept, embodiments of the present application provide a terminal apparatus, and the terminal apparatus may include a first determination unit 301, a second determination unit 302 and a synchronization unit 303. The first determination unit 301 is configured to support the terminal apparatus to perform step S101 in FIG. 1. The second determination unit 302 is configured to support the terminal apparatus to perform step S102 in FIG. 1. The synchronization unit 303 is configured to support the terminal apparatus to perform step S103 in FIG. 1. All relevant contents of various steps involved in the method embodiments may be referred to functional description of the corresponding functional module, and will not be described in detail herein.

Optionally, the second determination unit 302 is configured to:

if one or more synchronization sources are from the base station in the LTE network and/or the base station in the 5G network, and the terminal apparatus can directly synchronize with one or more synchronization sources, then:

search a downlink synchronization signal according to a frequency band configured for the terminal apparatus and a sub carrier spacing (SCS) in downlink synchronization information corresponding to the frequency band; and determine the synchronization source of the terminal apparatus from the one or more synchronization sources according to the searched downlink synchronization signal and a preset parameter.

The preset parameter at least includes one or more combinations of the following several parameters:

a receiving power of the downlink synchronization signal;

a synchronization offset between the base station and the GNSS;

a frequency band configured by the terminal apparatus and a timing offset and/or a frequency offset of SCS signal transmission in the downlink synchronization information corresponding to the frequency band; and reliability of service transmission of the terminal apparatus, wherein the reliability is configured to indicate one or more of a timing offset, a frequency offset, oxygen absorption loss influence, and rain attenuation influence of signal transmission in the frequency band corresponding to a service.

Optionally, if the preset parameter is the receiving power of the downlink synchronization signal, the second determination unit 302 is configured to:

determine a synchronization signal of which the receiving power is greater than the receiving power of the SCS in the downlink synchronization information corresponding to the frequency band configured for the terminal apparatus; and determine a synchronization source corresponding to the determined synchronization signal as the synchronization source of the terminal apparatus.

Optionally, if the preset parameter is the synchronization offset between the base station and the GNSS, the second determination unit 302 is configured to:

receive the synchronization offset between each of the one or more synchronization sources and the GNSS to obtain at least one synchronization offset;

select a synchronization offset which is within a first preset range from the at least one synchronization offset; and determine a synchronization source corresponding to the selected synchronization offset as the synchronization source of the terminal apparatus.

Optionally, if the preset parameter is the frequency band configured for the terminal apparatus and the timing offset and/or the frequency offset of signal transmission of the SCS in the downlink synchronization information corresponding to the frequency band, the second determination unit 302 is configured to:

determine a timing offset and/or a frequency offset of transmission over a high-frequency sub carrier obtained after frequency doubling of the low-frequency synchronization signal; and determine a synchronization source corresponding to the low-frequency synchronization signal as the synchronization source of the terminal apparatus if synchronization offset indicated by the timing offset and/or frequency offset of transmission over the high-frequency sub carrier is greater than the first preset threshold.

Optionally, if the preset parameter is the reliability of service transmission of the terminal apparatus, the second determination unit 302 is configured to:

determine that the synchronization offset indicated by the timing offset and/or the frequency offset of transmission over the high-frequency sub carrier obtained after frequency doubling of the low-frequency synchronization signal is greater than the synchronization offset of the synchronization signal obtained by the terminal apparatus in a high frequency band by the terminal apparatus; and determine a synchronization source corresponding to the synchronization signal obtained in the high frequency band as the synchronization source of the terminal apparatus by the terminal apparatus when the reliability of service transmission of the synchronization signal obtained in the high frequency band meets a preset condition.

Optionally, the second determination unit 302 is configured to:

if one or more synchronization sources are from the base station in the LTE network and/or the base station in the 5G network, and the terminal apparatus cannot directly synchronize with the one or more synchronization sources, then:

select the synchronization source of the terminal apparatus from the GNSS connected with the terminal apparatus; or, determine the synchronization source of the terminal apparatus from communication nodes which can directly synchronize with the base station in the LTE network and/or the base station in the 5G network.

Optionally, the second determination unit 302 is configured to:

if one or more synchronization sources are from the GNSS and the communication node, and the terminal apparatus cannot directly synchronize with the GNSS and the communication node, then:

determine the synchronization source of the terminal apparatus from multiple communication nodes adjacent to the terminal apparatus.

Optionally, if multiple communication nodes exist, the second determination unit 302 is configured to:

acquire a reference signal receiving power (RSRP) of the downlink synchronization signal of each of the multiple communication nodes to obtain multiple RSRPs;

determine the maximum RSRP in the multiple RSRPs, and determine the communication node corresponding to the downlink synchronization signal corresponding to the maximum RSRP as the synchronization source of the terminal apparatus;

or, select at least one RSRP which is greater than a second preset threshold from the multiple RSRPs, and determine the communication node corresponding to the downlink synchronization signal with the minimum synchronization offset as the synchronization source of the terminal apparatus from multiple downlink synchronization signals corresponding to at least one RSRP.

Optionally, the synchronization unit 303 is configured to:

select a first synchronization source from the determined synchronization sources if the terminal apparatus only can support maintenance of one synchronization source, wherein the stability of the synchronization signal of the first synchronization source meets a preset condition; and synchronize with the first synchronization source by configuration of a frequency band and a SCS which have the minimum timing offset.

Optionally, the synchronization unit 303 is configured to:

select multiple synchronization sources from the determined synchronization sources if the terminal apparatus can support maintenance of at least two synchronization sources, wherein the stability of the synchronization signals of the multiple synchronization sources meet a preset condition; and synchronize with the multiple synchronization sources by configuration of multiple frequency bands and SCSs which have the minimum timing offset.

Entity equipment corresponding to the first determination unit 301, the second determination unit 302 and the synchronization unit 303 may be the processor 201. The terminal apparatus may be configured to execute the method provided by the embodiments shown in FIG. 1. Therefore, functions which can be fulfilled by various functional modules in the equipment may refer to corresponding descriptions in the embodiments shown as FIG. 1, and will not be described in more detail.

The terminal apparatus may also be referred to as user equipment (called UE for short), a mobile station (called MS for short), a mobile terminal and the like, optionally, the terminal may have capability of communicating with one or more core networks through a radio access network (RAN), for example, the terminal may be a mobile phone (or called cell phone), or a computer with mobile property and the like, for example, the terminal may also be a portable, pocket, hand-held, computer-built-in, or vehicle-mounted mobile apparatus.

A base station may be network equipment (such as an access point), a server and the like. The base station refers to equipment which communicates with a wireless terminal in an access network on an air interface through one or more sectors. The base station may be configured to convert received air frames to IP groups as a router between the wireless terminal and the rest portion of the access network. The rest portion of the access network may include an internet protocol (IP) network. The base station may also coordinate attribute management for the air interface. For example, the base station may be a base transceiver station (BTS) in GSM or CDMA, a base station (Node B) in WCDMA, and an evolutional base station (Node B or eNB or e-Node B, evolutional Node B) in LTE, or may be a gNB in a 5G system, and the like. It is not limited in the embodiment of the present application.

Embodiments of the present application further provide a computer storage medium, a computer instruction is stored on the computer storage medium, and when the computer instruction runs on a computer, the computer executes the method shown as FIG. 1.

A person skilled in the art can clearly understand that for convenience and conciseness of description, division of various functional modules is only used for illustration, and in practical application, the function allocation may be completed by different functional modules according to needs, namely, the internal structure of an apparatus is divided into different functional modules to accomplish all or part of the functions described above. The specific working processes of the systems, apparatuses, and units described above may be referred to the corresponding processes in the method embodiment, and will not be described in detail herein.

In several embodiments provided in the present application, it should be understood that the disclosed apparatuses and methods may be implemented in other ways. For example, the apparatus embodiment described above is merely illustrative, for example, division of the modules or units is only division of logical functions, and there may be additional ways of division in actual implementation, for example, multiple units or components may be combined or integrated into another system, or some features may be omitted, or not performed. As another point, shown or discussed mutual coupling or direct coupling or communication connection may be indirect coupling or communication connection through some interfaces, devices or units, and may be in electrical, mechanical, or other forms.

The units described as separate components may or may not be physically separate, and the components shown as units may or may not be physical units, namely, the components may be located in one place, or may also be distributed on multiple network units. Part or all of the units may be selected according to actual needs to achieve the purpose of the solution of the embodiment.

In addition, various functional units in various embodiments of the present application may be integrated in one processing unit, or each unit may also exist independently and physically, or two or more units may be integrated in one unit. The integrated unit may be realized in a form of hardware and may also be realized in a form of a software functional unit.

When the integrated unit is implemented in the form of the software functional unit and sold or used as an independent product, and may be stored in a computer readable storage medium. Based on the understanding, the technical solution of the present application may be essentially embodied in a form of a software product, or a part, contributing to the prior art, of the technical solution, or all or part of the technical solution may be embodied in the form of the software product, and the computer software product is stored in a storage medium, and includes a plurality of instructions which are configured to enable one computer equipment (which may be a personal computer, a server or network equipment and the like) or a processor to execute all or part of steps of the method in the various embodiments of the present application. The storage medium includes various media capable of storing program codes, such as a universal serial bus flash disk, a mobile hard disk, a read-only memory (ROM), a random access memory (RAM), a magnetic disk or an optical disk and the like.

Those skilled in the art will appreciate that embodiments of the present application may be provided as a method, system, or computer program product. Thus, the present application may take the form of an entirely hardware embodiment, an entirely software embodiment, or an embodiment combining software and hardware aspects. Moreover, the present application may take a form of a computer program product implemented on one or more computer-usable storage media (including, but not limited to, a magnetic disk storage, a CD-ROM, an optical storage, and the like) having computer-usable program codes embodied therein.

The present application is described with reference to flow charts and/or block diagrams of methods, equipment (systems), and computer program products according to embodiments of the present application. It will be understood that each flow and/or block of the flow charts and/or block diagrams, and combinations of flows and/or blocks in the flow charts and/or block diagrams can be implemented by computer program instructions. These computer program instructions may be provided for a processor of a general-purpose computer, a special-purpose computer, an embedded processor or other programmable data processing equipment to generate a machine, so that instructions executed by a processor of a computer or other programmable data processing equipment produce a device for implementing functions specified in one or more flows of a flow chart and/or one or more blocks in a block diagram.

These computer program instructions may also be stored in a computer-readable memory which can guide a computer or other programmable data processing equipment to work in a particular manner, so that the instructions stored in the computer-readable memory produce a manufactured product including an instruction device, the instruction device implements functions specified in one or more flows of a flow chart and/or one or more blocks in a block diagram.

These computer program instructions may also be loaded onto a computer or other programmable data processing equipment, so that a series of operational steps are carried out on the computer or other programmable equipment to produce treatment implemented by the computer, and thus, instructions which are executed on the computer or other programmable equipment provide steps for implementing the functions specified in one or more flows in a flowchart and/or one or more blocks in a block diagram.

While the preferred embodiments of the present application have been described, additional variations and modifications in those embodiments may occur to those skilled in the art once they learn of the basic inventive concepts. Therefore, it is intended that the appended claims are interpreted as including the preferred embodiments and all variations and modifications that fall within the scope of the present application.

It will be apparent to those skilled in the art that various changes and modifications can be made in the embodiments of the present application without departing from the spirit and scope of the embodiments of the present application. Thus, if such modifications and variations of the embodiments of the present application fall within the scope of the claims of the present application and their equivalents, the present application is also intended to encompass such modifications and variations.

What is claimed is:

1. A synchronization method, comprising:
   determining, by a terminal apparatus, a type of synchronization sources; the synchronization sources comprising one or more combinations of:
   a base station in a long term evolution (LTE) network,
   a base station in the fifth generation mobile communication technology (5G) network,
   a global navigation satellite system (GNSS), and
   a communication node;
   determining, by the terminal apparatus, at least one synchronization source of the terminal apparatus from one or more synchronization sources matching the type; and
   synchronizing, by the terminal apparatus, with the at least one determined synchronization source;
   wherein the one or more synchronization sources matching the type are one or more base stations in the LTE network and/or the 5G network, the terminal apparatus is capable of synchronizing with the one or more synchronization sources directly, and said determining, by the terminal apparatus, the at least one synchronization source from the one or more synchronization sources comprises:
   searching, by the terminal apparatus, a downlink synchronization signal according to a frequency band configured for the terminal apparatus and a sub carrier spacing (SCS) in downlink synchronization information corresponding to the frequency band; and
   determining, by the terminal apparatus, the at least one synchronization source from the one or more synchronization sources according to the searched downlink synchronization signal and a preset parameter;
   wherein, the preset parameter at least comprises one or more combinations of following parameters: a receiving power of the downlink synchronization signal; a synchronization offset between a base station and a GNSS; the frequency band configured for the terminal apparatus, and a timing offset and/or a frequency offset of SCS signal transmission in the downlink synchronization information corresponding to the frequency band; and reliability of service transmission of the terminal apparatus;
   wherein, when the preset parameter is the synchronization offset between the base station and the GNSS, said determining, by the terminal apparatus, the at least one synchronization source from the one or more synchronization sources according to the searched downlink synchronization signal and the preset parameter, comprises:
   obtaining, by the terminal apparatus, at least one synchronization offset by receiving a synchronization offset between each of the one or more synchronization sources and the GNSS;
   selecting, by the terminal apparatus, a synchronization offset within a first preset range from the at least one synchronization offset; and
   determining, by the terminal apparatus, at least one synchronization source corresponding to the selected synchronization offset as the synchronization source of the terminal apparatus.

2. The method according to claim 1, wherein the reliability is configured to indicate one or more of a timing offset, a frequency offset, oxygen absorption loss influence, and rain attenuation influence of signal transmission in a frequency band corresponding to a service.

3. The method according to claim 2, wherein the preset parameter is the reliability of service transmission of the terminal apparatus, and said determining, by the terminal apparatus, the at least one synchronization source from the one or more synchronization sources according to the searched downlink synchronization signal and the preset parameter, comprises:
   determining, by the terminal apparatus, that a synchronization offset indicated by a timing offset and/or a frequency offset of transmission over a high-frequency sub carrier obtained by frequency doubling a low-frequency synchronization signal is greater than a synchronization offset of a synchronization signal obtained by the terminal apparatus in a high frequency band; and determining, by the terminal apparatus, at least one synchronization source corresponding to the synchronization signal obtained in the high frequency band as the synchronization source of the terminal apparatus when the reliability of service transmission of the synchronization signal obtained in the high frequency band meets a preset condition.

4. The method according to claim 1, wherein the preset parameter is the receiving power of the downlink synchronization signal, and said determining, by the terminal apparatus, the at least one synchronization source from the one or more synchronization sources according to the searched downlink synchronization signal and the preset parameter, comprises:

determining, by the terminal apparatus, a synchronization signal of which a receiving power is greater than a receiving power of the SCS in the downlink synchronization information corresponding to the frequency band configured for the terminal apparatus; and determining, by the terminal apparatus, at least one synchronization source corresponding to the determined synchronization signal as the synchronization source of the terminal apparatus.

5. The method according to claim 1, wherein the preset parameter is the frequency band configured for the terminal apparatus and the timing offset and/or frequency offset of SCS signal transmission in the downlink synchronization information corresponding to the frequency band, said determining, by the terminal apparatus, the at least one synchronization source from the one or more synchronization sources according to the searched downlink synchronization signal and the preset parameter, comprises:

determining, by the terminal apparatus, a timing offset and/or a frequency offset of transmission over a high-frequency sub carrier; wherein the high frequency sub carrier is obtained by frequency doubling a low-frequency synchronization signal; and determining, by the terminal apparatus, at least one synchronization source corresponding to the low-frequency synchronization signal as the synchronization source of the terminal apparatus when a synchronization offset indicated by the timing offset and/or the frequency offset of transmission over the high-frequency sub carrier is greater than a first preset threshold.

6. The method according to claim 1, wherein the one or more synchronization sources matching the type are one or more base stations in the LTE network and/or the 5G network, the terminal apparatus is incapable of synchronizing with the one or more synchronization sources directly, and said determining, by the terminal device, the at least one synchronization source from one or more synchronization sources comprises:

selecting, by the terminal apparatus, the synchronization source of the terminal apparatus from a GNSS connected with the terminal apparatus;

or, determining, by the terminal apparatus, the at least one synchronization source of the terminal apparatus from communication nodes which are capable of synchronizing with the one or more base stations in the LTE network and/or the 5G network directly.

7. The method according to claim 1, wherein the one or more synchronization sources are one or more GNSSs and one or more communication nodes, the terminal apparatus is incapable of synchronizing with the GNSSs and the communication nodes directly, said determining the at least one synchronization source from the one or more synchronization sources matching the type comprises:

determining, by the terminal apparatus, the at least one synchronization source of the terminal apparatus from multiple communication nodes adjacent to the terminal apparatus;

wherein said determining, by the terminal apparatus, the at least one synchronization source of the terminal apparatus from multiple communication nodes adjacent to the terminal apparatus, comprises:

obtaining, by the terminal apparatus, multiple reference signal receiving powers (RSRPs) by acquiring an RSRP of a downlink synchronization signal of each of the multiple communication nodes; and determining, by the terminal apparatus, a maximum RSRP from the multiple RSRPs; and determining, by the terminal apparatus, a communication node corresponding to a downlink synchronization signal corresponding to the maximum RSRP as the synchronization source of the terminal apparatus;

or, selecting, by the terminal apparatus, at least one RSRP greater than a second preset threshold from the multiple RSRPs; and determining, by the terminal apparatus, a communication node corresponding to a downlink synchronization signal with a minimum synchronization offset from multiple downlink synchronization signals corresponding to the at least one RSRP as the synchronization source of the terminal apparatus.

8. The method according to claim 1, wherein said synchronizing, by the terminal apparatus, with the at least one determined synchronization source, comprises:

when the terminal apparatus is capable of maintaining one synchronization source, selecting, by the terminal apparatus, a first synchronization source from the at least one determined synchronization source; wherein stability of a synchronization signal of the first synchronization source meets a preset condition; and synchronizing, by the terminal apparatus, with the first synchronization source by configuration of a frequency band and a SCS which have a minimum timing offset.

9. The method according to claim 1, wherein said synchronizing, by the terminal apparatus, with the at least one determined synchronization source comprises:

when the terminal apparatus is capable of maintaining at least two synchronization sources, selecting, by the terminal apparatus, multiple synchronization sources from determined synchronization sources, wherein stability of synchronization signals of the multiple synchronization sources meets a preset condition; and synchronizing, by the terminal apparatus, with the multiple synchronization sources by configuration of multiple frequency bands and SCSs which have a minimum timing offset.

10. A terminal apparatus, comprising:
a memory, configured to store instructions; and
a processor, configured to read the instructions in the memory and perform:

determining a type of synchronization sources; the synchronization sources comprising one or more combinations of:

a base station in a long term evolution (LTE) network,
a base station in the fifth generation mobile communication technology (5G) network, a global navigation satellite system (GNSS), and
a communication node;
determining, from one or more synchronization sources matching the type, at least one synchronization source of the terminal apparatus; and
synchronizing with the at least one determined synchronization source;
wherein the one or more synchronization sources are one or more base stations in the LTE network and/or the 5G network, the terminal apparatus is capable of synchronizing with the one or more synchronization sources directly, and the processor is configured to:
search a downlink synchronization signal according to a frequency band configured for the terminal apparatus and a sub carrier spacing (SCS) in downlink synchronization information corresponding to the frequency band; and
determine the at least one synchronization source of the terminal apparatus from the one or more synchronization sources according to the searched downlink synchronization signal and a preset parameter;
wherein, the preset parameter at least comprises one or more combinations of following parameters: a receiving power of the downlink synchronization signal; a synchronization offset between a base station and a GNSS; the frequency band configured for the terminal apparatus, and a timing offset and/or a frequency offset of SCS signal transmission in the downlink synchronization information corresponding to the frequency band; and reliability of service transmission of the terminal apparatus;
wherein, when the preset parameter is the synchronization offset between the base station and the GNSS, the processor is configured to:
obtain at least one synchronization offset by receiving a synchronization offset between each of the one or more synchronization sources and the GNSS through a receiver;
select a synchronization offset within a first preset range from the at least one synchronization offset; and
determine at least one synchronization source corresponding to the selected synchronization offset as the synchronization source of the terminal apparatus.

11. The terminal apparatus according to claim 10, wherein the reliability is configured to indicate one or more of a timing offset, a frequency offset, oxygen absorption loss influence, and rain attenuation influence of signal transmission in a frequency band corresponding to a service.

12. The terminal apparatus according to claim 11, wherein the preset parameter is the reliability of service transmission of the terminal apparatus, and the processor is configured to:
determine that a synchronization offset indicated by a timing offset and/or a frequency offset of transmission over a high-frequency sub carrier obtained by frequency doubling the low-frequency synchronization signal is greater than a synchronization offset of a synchronization signal obtained by the terminal apparatus in a high frequency band; and
determine at least one synchronization source corresponding to the synchronization signal obtained in the high frequency band as the synchronization source of the terminal apparatus when the reliability of service transmission of the synchronization signal obtained in the high frequency band meets a preset condition.

13. The terminal apparatus according to claim 10, wherein the preset parameter is the receiving power of the downlink synchronization signal, and the processor is configured to:

determine a synchronization signal of which a receiving power is greater than a receiving power of the SCS in the downlink synchronization information corresponding to the frequency band configured for the terminal apparatus; and
determine at least one; synchronization source corresponding to the determined synchronization signal as the synchronization source of the terminal apparatus.

14. The terminal apparatus according to claim 10, wherein the preset parameter is the frequency band configured for the terminal apparatus and the timing offset and/or frequency offset of SCS signal transmission in the downlink synchronization information corresponding to the frequency band, and the processor is configured to:
determine a timing offset and/or a frequency offset of transmission over a high-frequency sub carrier; wherein the high-frequency sub carrier is obtained by frequency doubling a low-frequency synchronization signal; and
determine at least one synchronization source corresponding to the low-frequency synchronization signal as the synchronization source of the terminal apparatus when a synchronization offset indicated by the timing offset and/or the frequency offset of transmission over the high-frequency sub carrier is greater than a first preset threshold.

15. The terminal apparatus according to claim 10, wherein the one or more synchronization sources are one or more base stations in the LTE network and/or the 5G network, the terminal apparatus is incapable of synchronizing with the one or more synchronization sources directly, and the processor is configured to:
select the synchronization source of the terminal apparatus from a GNSS connected with the terminal apparatus;
or,
determine the at least one synchronization source of the terminal apparatus from communication nodes which are capable of synchronizing with the one or more base stations in the LTE network and/or the 5G network directly.

16. The terminal apparatus according to claim 10, wherein the one or more synchronization sources are one or more GNSSs and one or more communication node, the terminal apparatus is incapable of synchronizing with the GNSSs and the communication nodes, and the processor is configured to:
determine the at least one synchronization source of the terminal apparatus from multiple communication nodes adjacent to the terminal apparatus;
wherein the processor is configured to:
obtain multiple reference signal receiving powers (RSRPs) by acquiring an RSRP of a downlink synchronization signal of each of the multiple communication nodes; and
determine a maximum RSRP from the multiple RSRPs, and determine a communication node corresponding to a downlink synchronization signal corresponding to the maximum RSRP as the synchronization source of the terminal apparatus;
or,
select at least one RSRP greater than a second preset threshold from the multiple RSRPs, and determine a communication node corresponding to a downlink synchronization signal with a minimum synchronization offset from multiple downlink synchronization signals corresponding to the at least one RSRP as the synchronization source of the terminal apparatus.

17. The terminal apparatus according to claim 10, wherein the processor is configured to:
   select a first synchronization source from the at least one determined synchronization source when the terminal apparatus is capable of maintaining one synchronization source, wherein stability of a synchronization signal of the first synchronization source meets a preset condition; and
   synchronize with the first synchronization source by configuration of a frequency band and a SCS which have a minimum timing offset.

18. The terminal apparatus according to claim 10, wherein the processor is configured to:
   select multiple synchronization sources from determined synchronization sources when the terminal apparatus is capable of maintaining at least two synchronization sources, wherein stability of synchronization signals of the multiple synchronization sources meets a preset condition; and
   synchronize with the multiple synchronization sources by configuration of multiple frequency bands and SCSs which have a minimum timing offset.

* * * * *